US008738356B2

(12) United States Patent
Suzuki et al.

(10) Patent No.: US 8,738,356 B2
(45) Date of Patent: May 27, 2014

(54) UNIVERSAL TEXT INPUT

(75) Inventors: Hisami Suzuki, Redmond, WA (US); Vikram Dendi, Redmond, WA (US); Christopher Brian Quirk, Seattle, WA (US); Pallavi Choudhury, Redmond, WA (US); Jianfeng Gao, Kirkland, WA (US); Achraf Chalabi, Cairo (EG)

(73) Assignee: Microsoft Corp., Redmond, WA (US)

( * ) Notice: Subject to any disclaimer, the term of this patent is extended or adjusted under 35 U.S.C. 154(b) by 395 days.

(21) Appl. No.: 13/110,484

(22) Filed: May 18, 2011

(65) Prior Publication Data

US 2012/0296627 A1   Nov. 22, 2012

(51) Int. Cl.
*G06F 17/28* (2006.01)

(52) U.S. Cl.
USPC .................................. 704/2; 704/8; 704/7

(58) Field of Classification Search
USPC ............... 704/1–10, 251, 255, 257, 270, 235; 707/767; 715/863, 262
See application file for complete search history.

(56) References Cited

U.S. PATENT DOCUMENTS

| | | | | |
|---|---|---|---|---|
| 7,257,528 B1 * | 8/2007 | Ritchie et al. | ...................... | 704/7 |
| 7,403,888 B1 | 7/2008 | Wang et al. | | |
| 7,908,287 B1 * | 3/2011 | Katragadda | ................... | 707/767 |
| 8,122,353 B2 * | 2/2012 | Bouta | ........................... | 715/262 |
| 2006/0074629 A1 | 4/2006 | Chiu et al. | | |
| 2006/0095843 A1 | 5/2006 | Chou | | |
| 2008/0126075 A1 | 5/2008 | Thorn | | |
| 2009/0055174 A1 * | 2/2009 | Han et al. | ....................... | 704/235 |
| 2009/0265669 A1 * | 10/2009 | Kida et al. | ..................... | 715/863 |
| 2011/0320472 A1 * | 12/2011 | Griffith et al. | ................ | 707/767 |

OTHER PUBLICATIONS

"Overview of Microsoft Phonetic Input Tool beta", Retrieved at <<http://www.merawindows.com/Newsletters/Articles/MSProducts/MicrosoftPhoneticTool.aspx>>, Retrieved Date: Mar. 22, 2011, pp. 2.
Binny, "A.I.Type: Type Faster by Text Auto-Complete and Text Prediction", Retrieved at <<http://www.ilovefreesoftware.com/30/windows/a-i-type-type-faster-by-text-auto-complete-and-text-prediction.html>>, Nov. 30, 2010, pp. 7.
"InputKing Online Input System", Retrieved at <<http://inputking.com/english/document.php>>, Retrieved Date: Mar. 22, 2011, p. 1.
"UIM A multilingual input method framework", Retrieved at <<http://code.google.com/p/uim/wiki/WhatsUIM>>, Retrieved Date: Mar. 22, 2011, pp. 3.
"Input Method Framework Overview", Retrieved at <<http://java.sun.com/j2se/1.5.0/docs/guide/imf/overview.html>>, Retrieved Date: Mar. 22, 2011, pp. 5.

(Continued)

*Primary Examiner* — Huyen X. Vo
(74) *Attorney, Agent, or Firm* — Steve Wight; Carole Boelitz; Micky Minhas (57) ABSTRACT

The universal text input technique described herein addresses the difficulties of typing text in various languages and scripts, and offers a unified solution, which combines character conversion, next word prediction, spelling correction and automatic script switching to make it extremely simple to type any language from any device. The technique provides a rich and seamless input experience in any language through a universal IME (input method editor). It allows a user to type in any script for any language using a regular qwerty keyboard via phonetic input and at the same time allows for auto-completion and spelling correction of words and phrases while typing. The technique also provides a modeless input that automatically turns on and off an input mode that changes between different types of script.

20 Claims, 4 Drawing Sheets

(56) References Cited

OTHER PUBLICATIONS

"Microsoft Maren", Retrieved at <<http://www.microsoft.com/middleeast/egypt/cmic/maren/>>, Retrieved Date: Mar. 22, 2011, pp. 2.

"Microsoft Indic Language Input Tool", Retrieved at <<http://specials.msn.co.in/ilit/Hindi.aspx>>, Retrieved Date: Mar. 22, 2011, p. 1.

"Google Input Method", Retrieved at <<http://www.google.com/ime/transliteration/>>, Retrieved Date: Mar. 22, 2011, p. 1.

"Sogou Pinyin IME", Retrieved at <<http://pinyin.sogou.com/cloud/>>, Retrieved Date: Mar. 22, 2011, pp. 2.

"Google Japanese IME", Retrieved at <<http://www.google.co.jp/intl/ja/ime/>>, Retrieved Date: Mar. 22, 2011, p. 1.

"Google Scribe", Retrieved at <<http://scribe.googlelabs.com/>>, Retrieved Date: Mar. 22, 2011, p. 1.

* cited by examiner

UNIVERSAL TEXT INPUT

BACKGROUND

Typing text that uses non-Roman alphabet characters has always been far more cumbersome than it could be, very often preventing the native speakers of languages that use non-Roman script from using their native languages in writing.

There are various reasons that make typing text in non-Roman characters unpopular. For example, an input method for inputting non-Roman script is not readily available. Typically a user must install a special keyboard or software for inputting non-Roman script. Even after such a keyboard and software installation, a user must learn which keys correspond to which characters in order to use it. This requires too much effort for casual users to type in their native script. It also causes many non-Roman script languages to be written in the Roman alphabet.

Another reason that typing in non-Roman text is not popular is that the accuracy of most input methods is not sufficient. For Chinese and Japanese, phonetic input has virtually been the sole method for inputting over 5,000 characters. In a phonetic input method, a user types in the characters as they are pronounced; these pronunciations are then converted into desired characters. Note that the conversion is by no means trivial, because the phonetic sequence is highly ambiguous. The best conversion depends on the context, domain, and ultimately on the user.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

The universal text input technique described herein offers a unified solution for text input which can simultaneously support character conversion from a phonetic string to script, next word prediction, spelling correction and automatic script switching between different types of scripts to make it extremely simple to type any language or script from any device.

One embodiment of the technique provides a rich and seamless input experience in any language through a universal input method editor (IME). The technique allows character conversion of a phonetic string in any supported language to any supported script. This allows a user to type in any script for any language using a regular qwerty keyboard via phonetic input.

DESCRIPTION OF THE DRAWINGS

The specific features, aspects, and advantages of the disclosure will become better understood with regard to the following description, appended claims, and accompanying drawings where:

DETAILED DESCRIPTION

In the following description of the universal text input technique, reference is made to the accompanying drawings, which form a part thereof, and which show by way of illustration examples by which the universal text input technique described herein may be practiced. It is to be understood that other embodiments may be utilized and structural changes may be made without departing from the scope of the claimed subject matter.

1.0 Universal Text Input Technique

The following sections provide an overview of the universal text input technique, as well as an exemplary architecture and exemplary processes for practicing the technique.

1.1 Overview of the Technique

It is impossible or extremely difficult to input non-Roman alphabet languages in many situations. Only fifteen percent of the world speaks English, French, Italian, German, Spanish or Portuguese natively, which use Roman-script and allow text to be entered with a conventional qwerty keyboard relatively easily. The majority of the remaining population uses a non-Roman-based script language which requires a user to use specialized equipment to input text into a computing device. In addition, there are many non-native speakers of the non-Roman-based script languages who need to input these languages, which is even more difficult due to the unfamiliality of these users to the input environment as well as to the language itself.

The universal text input technique described herein can speed up and improve various aspects of text input. The technique allows a user to type in any script for any language using a regular qwerty keyboard with no specific software installed, via phonetic input. It also provides for spelling correction, word prediction (predicting users' typing behavior to save on the typing cost), and modeless input (an automatic switching of script types via an input mode that is automatically turned on and off depending on the character sequence being typed), within a unified framework. In addition, to assist users not completely familiar with the language they input, features that enhance the user experience of the selection of the desired candidate, such as providing the translation of the candidate list into a desired language, or providing a usage example, are also possible.

In one embodiment, the technique provides a rich and seamless input experience in any language through a cloud-based, universal input method editor (IME).

One embodiment of the technique provides a web service that delivers the aforementioned functionalities for as many languages as possible, possibly all languages, by integrating existing services that are only separately available now, as well as by delivering state-of-the-art technologies for text input. The benefit of this unified approach is truly extensive. For example, one embodiment of the universal text input technique provides a Universal Input API that makes it significantly easier for existing products and services to integrate with and use the universal text input technique. Existing IMEs for individual languages have a better chance of being widely adopted if they are offered as part of a global solution such as provided by the universal text input technique described herein. One embodiment of the technique directly improves end user experience worldwide as it dramatically improves the input experience of users of non-Roman scripts, including both the native and non-native speakers of these languages. In addition, the technique also provides an enhanced experience for the writers of English text, such as, for example, when users are typing symbols.

In one exemplary embodiment of the universal text input technique, the technique uses a generalized source-channel model. This source-channel model is simple and has been used in many large-scale natural language applications. The generalized model, which combines various feature functions to rank the candidates in a linear model, is well-suited for addressing the additional candidates for the prediction and modeless extensions, thereby allowing the technique to treat the distinct aspects of text input in a single framework.

User data collection through a universal text input service is also an aspect of the technique that can be implemented. The technique can use collected keystroke-text data to re-train or refine its lexicon and models User/domain adaptation is also possible through the use of such user data by training or refining user/domain-specific lexicon and models.

The technique offers scalability and the flexibility of using a restricted amount of resources when necessary. For example, the technique can be supported on a mobile phone, or desktop computing device without a network connection, by using smaller lexicons and ranking models located on the mobile phone or desktop computing device. When connected via a network to one or more servers or a computing cloud, the technique can automatically use larger models and lexicons accessed via the network for an enhanced text input experience (e.g., better accuracy by using larger models and more language choices). In one embodiment of the technique, a client-based (or offline) IME can be scaled up by a cloud-based model to allow for a better quality and performance.

1.2 Exemplary Architecture

Figure 1:
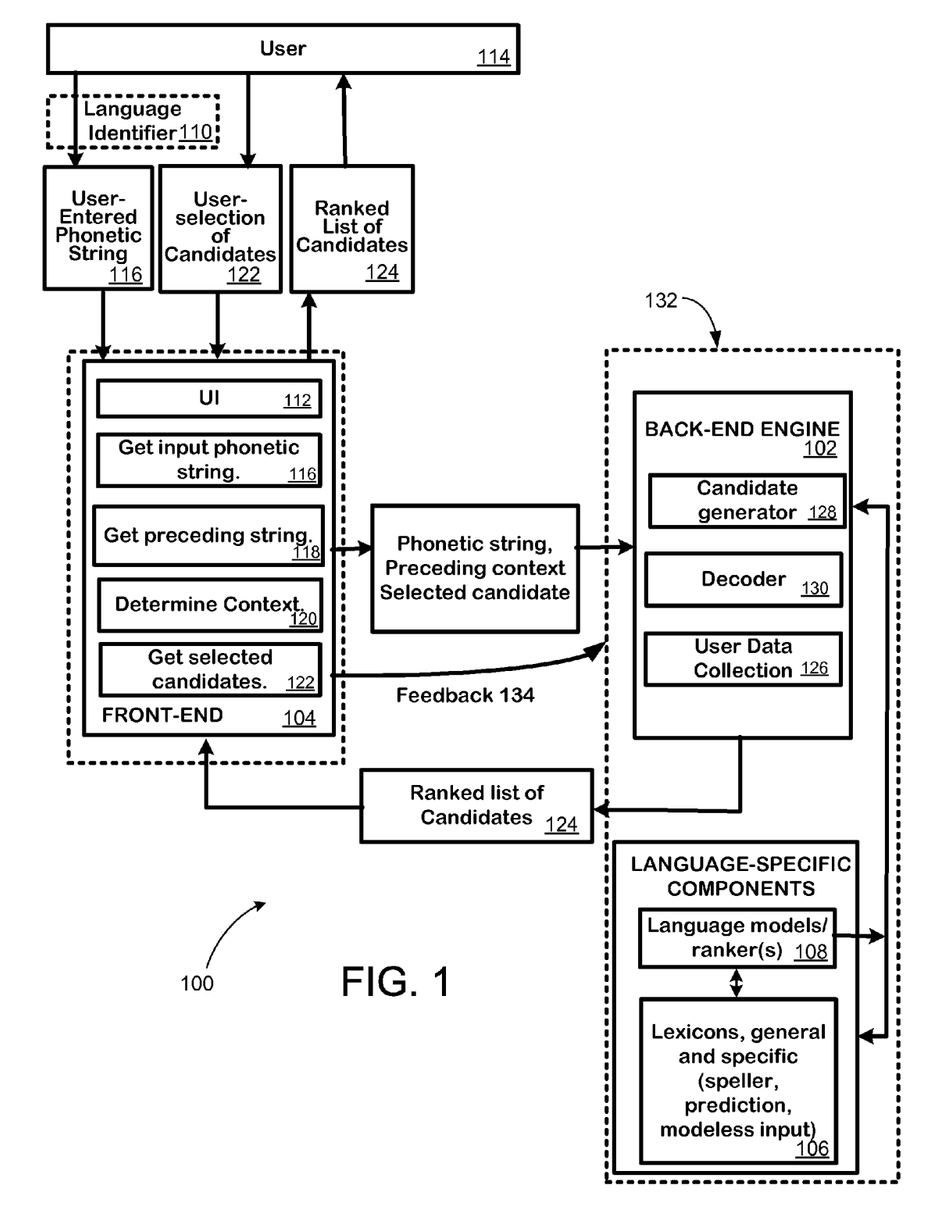
FIG. 1 is an exemplary architecture for practicing one exemplary embodiment of the universal text input technique described herein.

FIG. 1 shows an exemplary architecture 100 for practicing one embodiment of the universal text input technique. As shown if FIG. 1, this exemplary architecture includes a back-end engine 102 and a front-end module 104. In one exemplary embodiment of the architecture 100, the front-end module resides on a general purpose computing device 400, which will be described later in greater detail with respect to FIG. 4. In one exemplary embodiment of the technique, the back-end engine 102 resides on one or more servers or a computing cloud 132.

The back-end engine 102 interfaces with the front-end module 104 and one or more lexicons 106 and one or more language models or other ranking models 108. In general, a lexicon of a language is its vocabulary, including its words and expressions. In one embodiment of the technique described herein, a lexicon for each supported language takes an input in phonetic form and outputs textual words or symbols that correspond to the input phonetic form in order to create a list of candidates to replace the input in phonetic form. Besides there being separate lexicons to support the conversion of the input phonetic string for each language supported, there can also be separate lexicons to support other text input functions such as spelling correction, next word predication and input mode changing, though all of these lexicons can be substantially overlapping with each other. In one embodiment of the technique, lexicons can provide output candidates with or without probabilities for each candidate.

As candidates are generated by the lexicons 106, the language models 108 can be simultaneously used to determine the probability of each candidate in the candidate list. For example, each language model 108, one for each language supported, assigns a probability to a sequence of m words $P(\omega_1, \ldots, \omega_m)$ by means of a probability distribution. These probabilities can be used to rank the candidates in the list of candidates generated by its corresponding lexicon. Other lexicons and associated ranking models can be used to generate other candidate lists with associated probabilities (e.g., for spelling correction, next word prediction, modeless input, and so forth). All of the lists of ranked candidates can then be combined to create a combined list that is ranked based on the determined probabilities by using the decoder 130, as will be discussed below.

In one embodiment of the technique, the back-end engine 102 can also optionally interface with a language identifier 110 which determines the language a user is entering to select the proper lexicon and language model for the text the user is entering.

The front-end module 104 provides a user interface 112 for a user 114 to input text in the form of a phonetic string 116. It also retrieves the preceding string 118 that the user 114 entered in order to determine the context of the user's input string 116 in a context determining module 120 of the text input that the user is entering. For example, the context determining module 120 of the front-end module 104 might determine if a current input phonetic string is in the same language as a previously input phonetic string. Or the context determining module 120 of the front-end module 104 might determine what country the user is in, what area of a document or an application the user is typing in. More generally, context can be anything that the backend engine uses to refine the ranking—for example, it can include user location, history of previously typed text by the user, the application that the user is typing in, and so forth.

In one embodiment of the technique, the user 114 can specify via the user interface 112 the languages the user would prefer to use and the output types the user would like to see (for example, conversion, spelling correction, next word prediction, modeless input). The user 114 may also specify the languages or scripts that are acceptable for modeless input (e.g., what language or script the phonetic input string should be converted into). The front-end module 104 also allows a user 114 to select a candidate string 122 from a ranked list of candidates 124, provided by the back-end engine 102, to replace the phonetic string 116 that the user is typing or otherwise entering. In one embodiment, the front-end module 104 also provides the back-end engine 102 with a user ID and a session ID to correlate various data with a given user and session. The front-end module 104 provides the input phonetic string 116, preceding determined context 120 and selected candidates 122 (as well as user ID and session ID) to the back-end engine 102.

The back-end engine 102 has a user data collection module 126, a candidate generator 128 and a decoder 130. The user data collection module 126 collects user data such as user session ID, user ID, the candidates a user selects, and user context. The data collected in the user data collection module 126 can be used to train or refine the lexicon and models that determine the probabilities discussed previously.

The candidate generator 128 generates candidates to replace the phonetic string 116 that the user enters in order to speed up text input by providing for character conversion, next word prediction, spelling correction and automatic script switching thereby making it extremely simple to type any language from any device. The candidate generator 128 generates candidates using one or more lexicons 106 and/or one or more language models 108, which are language dependent. (In most cases, the candidates are generated using a lexicon, but it is also possible for the technique to generate candidates that are not in the lexicon by using only language models.) In one embodiment of the universal text input technique a source channel model is used to model the lexicons and language models, allowing for the mapping of the user input string with output candidates. The source channel model also receives the candidates that a user selects. It uses the user candidate selections and cross correlates these with the input and outputs in the lexicon to improve the list of candidates when a user inputs the same or similar phonetic string 116.

In one embodiment of the technique, once the candidate generator 128 generates a list of output candidates, a language model or other ranking model 108 (e.g., a spelling candidate ranker, a next word prediction ranker, and input mode ranker) provides the probabilities for each of the candidates in the list of output candidates, as discussed above. In one embodiment, a decoder 130 ranks the list of candidates by their determined probabilities in real-time. In general, the decoder 130 uses the outputs of the lexicon(s) and language models or other statistical model(s), and produces a ranked list of candidates 124 for conversion of the phonetic string into a desired script, spelling correction, word auto-completion and next word prediction. The decoder 130 is used at runtime (when the technique actually converts/spell-corrects and so forth the input text). Runtime (decoding time) can be contrasted with training time, which takes lexicon(s) and training data to build or improve the language models and other ranking models 108.

The ranked list 124, in one embodiment includes, for each candidate, a score, a candidate type, script ID, along with the actual output to replace the user input. Each candidate can further be accompanied by any additional information about the candidate, such as their translations into a desired foreign language, or a usage example of the candidate. The candidate type, in one embodiment, is the type of candidate returned— for example, spelling correction, transliteration, or next word prediction results. The script ID in one embodiment is the script and language that the output is provided in. It should be noted that in one embodiment the script ID represents a script and a language together—so English is different than Romanized Arabic, which is again different from Arabic in native script.

The ranked list 124 of candidates is sent back to the user 114 via the user interface 112 of the front-end 104, as he or she is typing text. The user can then select the candidate 122 from the ranked list 124 that matches their intention when entering the input phonetic string, and this selected candidate 122 is used to replace the input phonetic string 116 in the text the user 114 is typing. The user selection 122 can also be used as feedback 134 to improve the lexicons and language and other ranking models.

1.2 Exemplary Processes for Practicing the Technique

Figure 2:
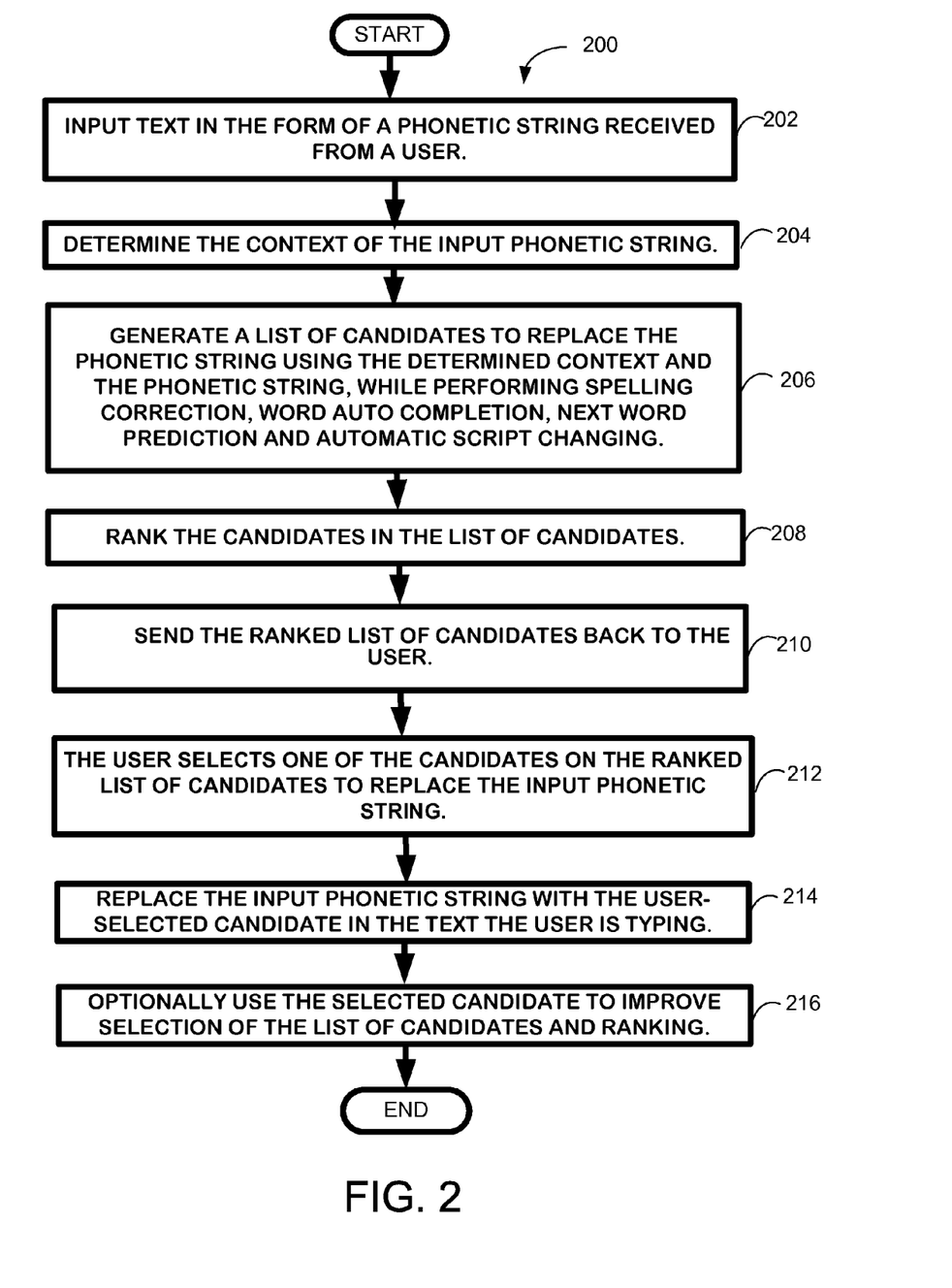
FIG. 2 depicts a flow diagram of an exemplary process for employing one embodiment of the universal text input technique.

FIG. 2 shows an exemplary process 200 for practicing one embodiment of the universal text input technique. The process operates as follows to convert an input phonetic string to a list of candidates to replace the phonetic string while a user is typing.

A user inputs text in the form of a phonetic string, as shown in block 202. In one embodiment of the technique, a user ID and user session ID is used to correlate the input phonetic string with the particular user. Additionally, in one embodiment of the technique, the text can be input as a voice command and then converted to a phonetic text string via conventional voice to text processing.

The context of the input phonetic string is then determined, as shown in block 204. More specifically, in one embodiment of the universal text input technique, the context of the phonetic string is determined based on phonetic strings previously entered by the user, or the area of a document or an application from which the text is entered.

A list of candidates to replace the phonetic string is generated using the determined context of the input phonetic string, while performing conversion of the phonetic string, spelling correction, word auto-completion, next word prediction and automatic script changing based on the context of the input string, as shown in block 206. In one embodiment of the technique, the candidate list is generated by using at least one lexicon and at least one language model. A lexicon is used to map the user input string with output candidates. In one embodiment of the technique, user feedback is employed to improve or train the lexicons and language models. For example, in one embodiment of the technique, each lexicon also receives the candidates that a user selects. In one embodiment of the universal text input technique, each lexicon uses the user candidate selections and cross correlates these with the input and outputs in the lexicon to improve the list of candidates when a user subsequently inputs the same or similar phonetic string.

Once the list of candidates is obtained, the list of candidates is then ranked, as shown in block 208. The ranked list of candidates is then sent back to the user, as shown in block 210, and the user can select a candidate from the list that matches their intention when entering the input phonetic string, as shown in block 212. This selected candidate is used to replace the phonetic string that the user is typing in real-time, as shown in block 214.

The candidate selected by the user can optionally be used to improve the lexicons and ranking models used in the creation and ranking of the list of candidates, as shown in block 216 and discussed previously.

Figure 3:
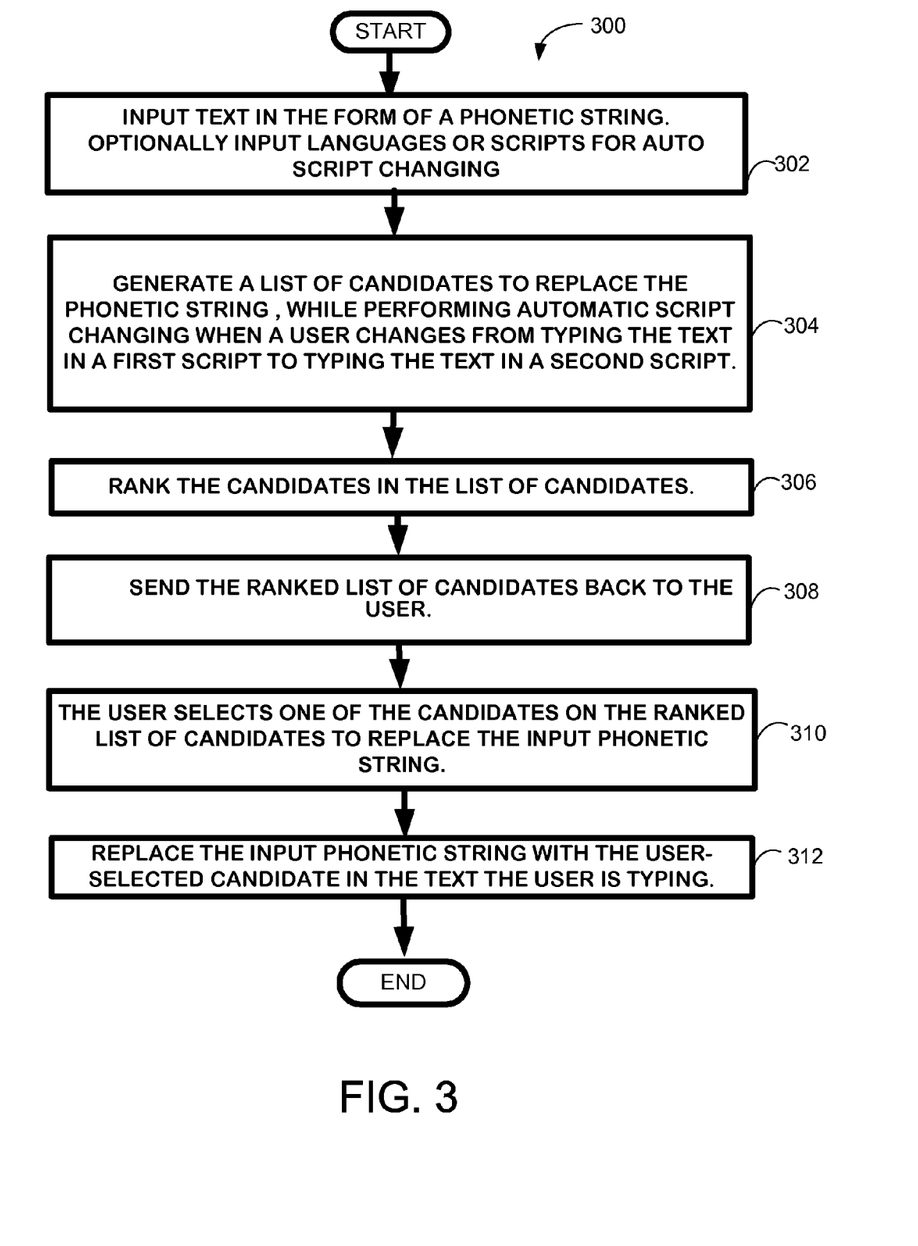
FIG. 3 depicts another flow diagram of another exemplary process for employing one embodiment of the universal text input technique.

FIG. 3 shows another exemplary process 300 for practicing one embodiment of the universal text input technique. The process operates as follows to convert an input phonetic string to a list of candidates to replace the phonetic string with a desired language or script while a user is typing.

A user inputs text in the form of a phonetic string, as shown in block 302. The user can also optionally specify what input language they are inputting and what language or script they want to see output while in an automatic script changing mode.

A list of candidates to replace the input phonetic string while performing script changing is generated, as shown in block 304. Other functions can also be selected to be used with the automatic script changing mode, such as, for example, transliteration or conversion of the input phonetic string, spelling correction of the input phonetic string, word auto-completion, and next word prediction of the input phonetic string. In one embodiment of the technique, the candidate list is generated by using at least one lexicon and at least one language model. Ideally, many lexicons and language models are used to support many languages and scripts, if not all. Each lexicon maps the user input string with output candidates.

The list of candidates is then ranked, as shown in block 306. In one embodiment a language model or other model determines the probability of each candidate and these probabilities are then used to ranks the list of output candidates by their likelihood of being what the user is attempting to type with the input phonetic string. The ranked list of candidates is then sent back to the user, as shown in block 308. The user then selects a candidate from the ranked list, as shown in block 310. This selected candidate is then used to replace the phonetic string that the user is typing in real-time, as shown in block 312. The candidate selected by the user can also optionally be used to improve the creation and ranking of the list of candidates for future user input as discussed previously.

Figure 4:
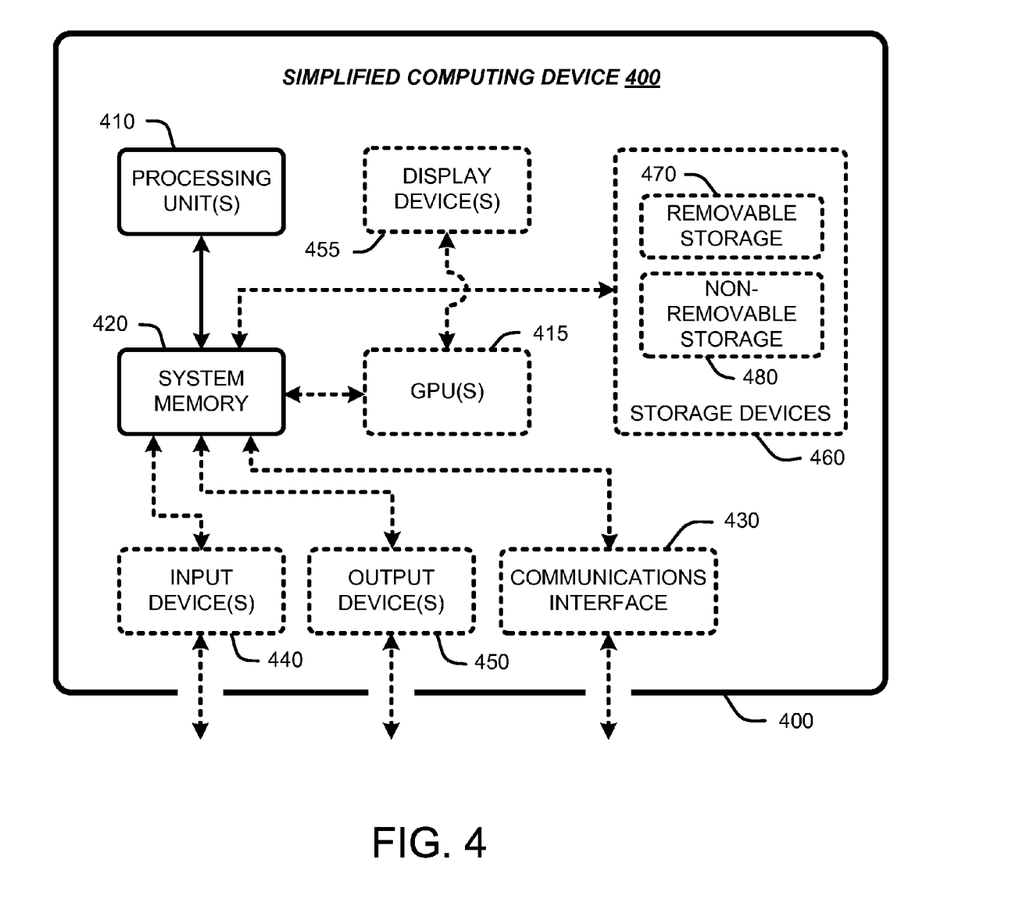
FIG. 4 is a schematic of an exemplary computing environment which can be used to practice the universal text input technique.

2.0 Exemplary Operating Environments:

The universal text input technique described herein is operational within numerous types of general purpose or special purpose computing system environments or configurations. FIG. 4 illustrates a simplified example of a general-purpose computer system on which various embodiments and elements of the universal text input technique, as described herein, may be implemented. It should be noted that any boxes that are represented by broken or dashed lines in FIG. 4 represent alternate embodiments of the simplified computing device, and that any or all of these alternate embodiments, as described below, may be used in combination with other alternate embodiments that are described throughout this document.

For example, FIG. 4 shows a general system diagram showing a simplified computing device 400. Such computing devices can be typically be found in devices having at least some minimum computational capability, including, but not limited to, personal computers, server computers, hand-held computing devices, laptop or mobile computers, communications devices such as cell phones and PDA's, multiprocessor systems, microprocessor-based systems, set top boxes, programmable consumer electronics, network PCs, mini-computers, mainframe computers, audio or video media players, etc.

To allow a device to implement the universal text input technique, the device should have a sufficient computational capability and system memory to enable basic computational operations. In particular, as illustrated by FIG. 4, the computational capability is generally illustrated by one or more processing unit(s) 410, and may also include one or more GPUs 415, either or both in communication with system memory 420. Note that that the processing unit(s) 410 of the general computing device of may be specialized microprocessors, such as a DSP, a VLIW, or other micro-controller, or can be conventional CPUs having one or more processing cores, including specialized GPU-based cores in a multi-core CPU.

In addition, the simplified computing device of FIG. 4 may also include other components, such as, for example, a communications interface 430. The simplified computing device of FIG. 4 may also include one or more conventional computer input devices 440 (e.g., pointing devices, keyboards, audio input devices, video input devices, haptic input devices, devices for receiving wired or wireless data transmissions, etc.). The simplified computing device of FIG. 4 may also include other optional components, such as, for example, one or more conventional computer output devices 450 (e.g., display device(s) 455, audio output devices, video output devices, devices for transmitting wired or wireless data transmissions, etc.). Note that typical communications interfaces 430, input devices 440, output devices 450, and storage devices 460 for general-purpose computers are well known to those skilled in the art, and will not be described in detail herein.

The simplified computing device of FIG. 4 may also include a variety of computer readable media. Computer readable media can be any available media that can be accessed by computer 400 via storage devices 460 and includes both volatile and nonvolatile media that is either removable 470 and/or non-removable 480, for storage of information such as computer-readable or computer-executable instructions, data structures, program modules, or other data. By way of example, and not limitation, computer readable media may comprise computer storage media and communication media. Computer storage media includes, but is not limited to, computer or machine readable media or storage devices such as DVD's, CD's, floppy disks, tape drives, hard drives, optical drives, solid state memory devices, RAM, ROM, EEPROM, flash memory or other memory technology, magnetic cassettes, magnetic tapes, magnetic disk storage, or other magnetic storage devices, or any other device which can be used to store the desired information and which can be accessed by one or more computing devices.

Storage of information such as computer-readable or computer-executable instructions, data structures, program modules, etc., can also be accomplished by using any of a variety of the aforementioned communication media to encode one or more modulated data signals or carrier waves, or other transport mechanisms or communications protocols, and includes any wired or wireless information delivery mechanism. Note that the terms "modulated data signal" or "carrier wave" generally refer a signal that has one or more of its characteristics set or changed in such a manner as to encode information in the signal. For example, communication media includes wired media such as a wired network or direct-wired connection carrying one or more modulated data signals, and wireless media such as acoustic, RF, infrared, laser, and other wireless media for transmitting and/or receiving one or more modulated data signals or carrier waves. Combinations of the any of the above should also be included within the scope of communication media.

Further, software, programs, and/or computer program products embodying the some or all of the various embodiments of the universal text input technique described herein, or portions thereof, may be stored, received, transmitted, or read from any desired combination of computer or machine readable media or storage devices and communication media in the form of computer executable instructions or other data structures.

Finally, the universal text input technique described herein may be further described in the general context of computer-executable instructions, such as program modules, being executed by a computing device. Generally, program modules include routines, programs, objects, components, data structures, etc., that perform particular tasks or implement particular abstract data types. The embodiments described herein may also be practiced in distributed computing environments where tasks are performed by one or more remote processing devices, or within a cloud of one or more devices, that are linked through one or more communications networks. In a distributed computing environment, program modules may be located in both local and remote computer storage media including media storage devices. Still further, the aforementioned instructions may be implemented, in part or in whole, as hardware logic circuits, which may or may not include a processor.

It should also be noted that any or all of the aforementioned alternate embodiments described herein may be used in any combination desired to form additional hybrid embodiments. Although the subject matter has been described in language specific to structural features and/or methodological acts, it is to be understood that the subject matter defined in the appended claims is not necessarily limited to the specific features or acts described above. The specific features and acts described above are disclosed as example forms of implementing the claims.

What is claimed is:

1. A computer-implemented process for speeding up typing, comprising:
   using a computing device for:
   receiving text in the form of a phonetic string from a user creating a document;
   determining a context of the input phonetic string;
   converting the input phonetic string into a supported language and a supported script using the determined context;

generating a list of candidates in the supported language and the supported script to replace the phonetic string using the determined context of the input phonetic string, while performing spelling correction, word auto-completion, next word prediction and automatic script changing based on the context of the input string;

ranking the candidates in the list of candidates;

sending the ranked list of candidates back to the user;

the user selecting one of the candidates on the ranked list of candidates to replace the input phonetic string; and replacing the input phonetic string with the user-selected candidate in the supported language and the supported script in the text of the document the user is creating.

2. The computer-implemented process of claim 1, wherein the context of the phonetic string is determined based on phonetic strings previously entered by the user and other users.

3. The computer-implemented process of claim 1, wherein the candidate list is generated by using at least one lexicon or at least one language model.

4. The computer-implemented process of claim 1, wherein the lexicon maps the user input string with output candidates, with or without associated probabilities.

5. The computer-implemented process of claim 1, wherein generating a list of candidates and ranking the candidates further comprises using a source channel model.

6. The computer-implemented process of claim 1, wherein a language model ranks the list of candidates by their likelihood of being what the user intends to type with the input phonetic string.

7. The computer-implemented process of claim 1, further comprising using the candidate selected by the user to improve the creation of the list of candidates for future user input.

8. The computer-implemented process of claim 1, further comprising using the candidate selected by the user to improve the ranking of the list of candidates for future user input.

9. The computer-implemented process of claim 1, further comprising using a user ID and user session ID is to correlate the input phonetic string with the particular user and user session.

10. A computer-implemented process for increasing the speed of text entry, comprising:

using a computing device for:

receiving text in the form of a phonetic string;

determining the language and the script of the phonetic string;

generating a list of candidates in the determined language and the determined script to replace the phonetic string, while performing automatic script changing when a user changes from typing the text in a first script to typing text in a second script;

ranking the candidates in the list of candidates;

sending the ranked list of candidates back to the user;

the user selecting one of the candidates on the ranked list of candidates to replace the input phonetic string; and replacing the input phonetic string with the user-selected candidate in the text the user is typing.

11. The computer-implemented process of claim 10, further comprising determining the language of the first script and the language of the second script before the user changes from typing in the first script to the second script.

12. The computer-implemented process of claim 10, wherein the list of candidates is determined by the context of the input phonetic string and phonetic strings previously entered by the user.

13. The computer-implemented process of claim 10, further comprising displaying the ranked candidates with additional information comprising translation of words and usage examples.

14. The computer-implemented process of claim 10, wherein the lexicon and the language model are scalable to accommodate differences in user input devices.

15. The computer-implemented process of claim 10, wherein a language model ranks the list of candidates by their likelihood of being what the user is attempting to type with the input phonetic string.

16. The computer-implemented process of claim 10, further comprising correcting spelling errors while generating the list of candidates by using at least one spelling correction lexicon and any associated ranking model.

17. The computer-implemented process of claim 10, further comprising predicting the next word or words while generating the list of candidates by using at least one next word prediction lexicon and an associated ranking model.

18. The computer-implemented process of claim 10, further comprising performing word auto completion while generating the list of candidates by using at least one auto completion lexicon and any associated ranking model.

19. The computer-implemented process of claim 10, wherein the input text in the form of a phonetic string is received from the user as a verbal command and is converted to text.

20. A system for speeding up the input of text displayed on the display of a computing device, comprising:

a general purpose computing device;

a computer program comprising program modules executable by the general purpose computing device, wherein the computing device is directed by the program modules of the computer program to, provide a user interface for a user to input text in the form of a phonetic string for the creation of a document;

generate a ranked list of candidates to replace the phonetic string while simultaneously performing spelling correction, word auto-completion, next word prediction and automatic script changing;

display the generated list of candidates to the user; and allow the user to select a candidate from the list of candidates to replace the phonetic string in text in the document the user is typing.

* * * * *